US012566681B2

(12) United States Patent
Rajashekharappa et al.

(10) Patent No.: US 12,566,681 B2
(45) Date of Patent: Mar. 3, 2026

(54) AUTOMATIC TRANSACTION PROCESSING FAILOVER AND RECONCILIATION

(71) Applicant: FMR LLC, Boston, MA (US)

(72) Inventors: Ashok Haluvarthi Rajashekharappa, Bangalore (IN); Yogesh Kumar Mishra, Bangalore (IN); Nallapureddy Madhavi Latha, Bangalore (IN); Roshan Ramesh, Bangalore (IN); Krishna Mohan Madhu Mohanan Pillai, Ernakulam (IN); Ravi Dutt Yadav, Prayagraj (IN); Nikhil Menokil, Thrissur (IN); Nizara Fathima Naina Mohamed, Chennai (IN)

(73) Assignee: FMR LLC, Boston, MA (US)

( * ) Notice: Subject to any disclaimer, the term of this patent is extended or adjusted under 35 U.S.C. 154(b) by 22 days.

(21) Appl. No.: 18/529,748

(22) Filed: Dec. 5, 2023

(65) Prior Publication Data

US 2025/0103449 A1     Mar. 27, 2025

Related U.S. Application Data

(60) Provisional application No. 63/540,459, filed on Sep. 26, 2023.

(51) Int. Cl.
*G06F 11/00*        (2006.01)
*G06F 11/20*        (2006.01)

(52) U.S. Cl.
CPC ............................... *G06F 11/2005* (2013.01)

(58) Field of Classification Search
CPC .................................................... G06F 11/2005
USPC ......................................................... 714/1–57
See application file for complete search history.

(56) References Cited

U.S. PATENT DOCUMENTS

| | | | | |
|---|---|---|---|---|
| 7,346,905 B2 * | 3/2008 | Dorrance | ............ | G06F 16/2365 |
| | | | | 719/329 |
| 7,752,340 B1 * | 7/2010 | Porat | ................... | G06F 11/1443 |
| | | | | 710/5 |
| 8,667,366 B1 * | 3/2014 | de la Iglesia | ....... | G06F 11/1004 |
| | | | | 714/763 |
| 11,514,448 B1 | 11/2022 | Liberman | | |
| 11,616,713 B2 | 3/2023 | Gupta et al. | | |
| 11,973,823 B1 * | 4/2024 | Ghorpade | ........... | H04L 67/1097 |
| 2005/0283636 A1 * | 12/2005 | Vasudevan | .......... | G06F 11/2046 |
| | | | | 714/2 |
| 2012/0023369 A1 * | 1/2012 | Bourbonnais | ....... | G06F 16/2386 |
| | | | | 714/E11.131 |

(Continued)

*Primary Examiner* — Sarai E Butler

(74) *Attorney, Agent, or Firm* — Cesari and McKenna, LLP

(57) ABSTRACT

Automatic transaction processing failover and reconciliation in a cloud-based environment includes monitoring the processing of transaction messages to identify exception events and determining whether to initiate a failover switch based upon the identified exception events. When a failover switch is initiated, the system identifies a target cloud-based system instance for the failover switch, changes a state of the affected cloud-based system instance to prevent the affected instance from receiving transaction messages, changes a state of the target instance to receive transaction messages intended for the affected instance, and performs a replication check between databases. The system reconciles transaction messages stored in the database of the cloud-based system instance to identify anomalies.

24 Claims, 5 Drawing Sheets

Process transaction messages received from remote computing devices 302

Monitor processing of the transaction messages to identify exception events 304

Determine whether to initiate a failover switch based upon the identified events 306

Identify a target cloud-based system instance for the failover switch 308

Change a state of the cloud-based system instance to prevent the receipt of transaction messages 310

Change a state of the target cloud-based system instance to receive transaction messages intended for the cloud-based system instance 312

Perform a replication check between databases in the cloud-based system instances 314

Reconcile transaction messages to identify anomalies 316

300

(56)     References Cited

U.S. PATENT DOCUMENTS

| | | | |
|---|---|---|---|
| 2018/0239677 A1* | 8/2018 | Chen | G06F 11/203 |
| 2019/0102266 A1 | 4/2019 | Park et al. | |
| 2019/0146886 A1* | 5/2019 | Brunzema | G06F 11/1471 |
| | | | 714/20 |
| 2019/0188097 A1* | 6/2019 | Gupta | G06F 11/3034 |
| 2019/0235969 A1* | 8/2019 | Sharma | G06F 21/604 |
| 2020/0007666 A1* | 1/2020 | Amin | H04L 41/0677 |
| 2021/0374850 A1 | 12/2021 | Sankaran et al. | |
| 2021/0382847 A1* | 12/2021 | De Lescure | H04L 49/103 |
| 2022/0045930 A1* | 2/2022 | Williams | H04L 43/0805 |
| 2022/0083437 A1* | 3/2022 | Zou | G06F 11/1438 |
| 2022/0215039 A1* | 7/2022 | Xu | G06F 16/2343 |
| 2022/0253340 A1 | 8/2022 | Sterbling et al. | |
| 2023/0229574 A1* | 7/2023 | Gandluri | G06F 11/2038 |
| | | | 714/4.11 |
| 2023/0318984 A1* | 10/2023 | Biran | H04L 47/39 |
| | | | 370/241 |
| 2023/0336621 A1* | 10/2023 | Haserodt | H04L 41/0663 |
| 2024/0168854 A1* | 5/2024 | Padia | G06F 9/45558 |

* cited by examiner

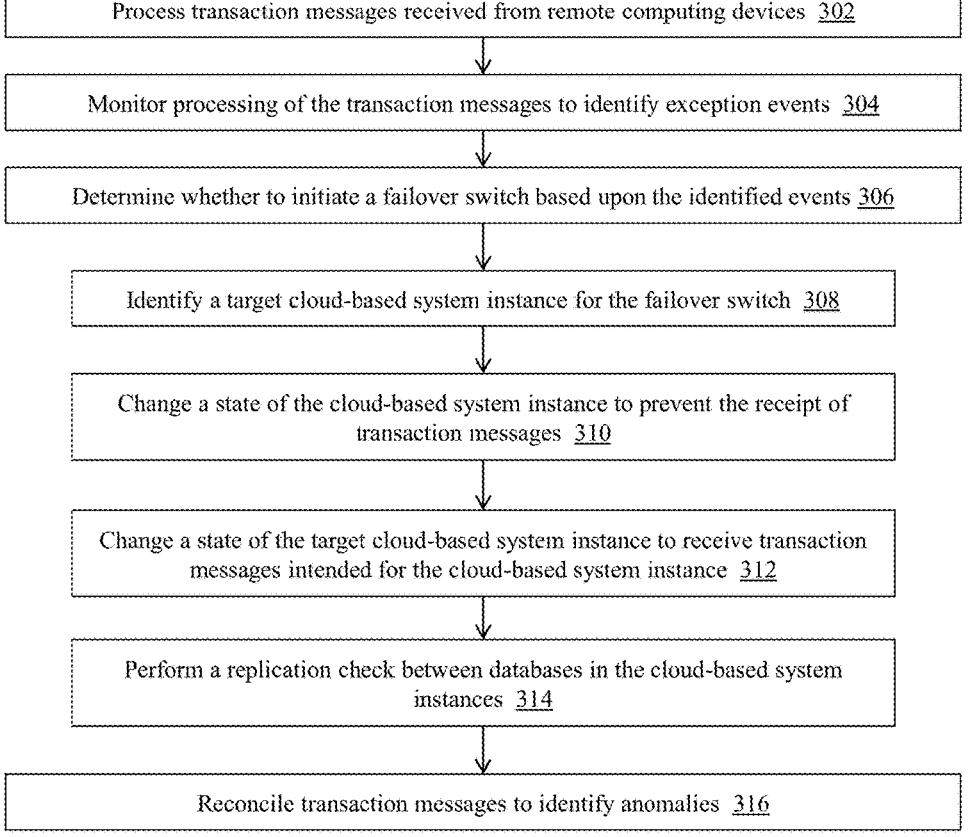

| Process transaction messages received from remote computing devices 302 |

| Monitor processing of the transaction messages to identify exception events 304 |

| Determine whether to initiate a failover switch based upon the identified events 306 |

| Identify a target cloud-based system instance for the failover switch 308 |

| Change a state of the cloud-based system instance to prevent the receipt of transaction messages 310 |

| Change a state of the target cloud-based system instance to receive transaction messages intended for the cloud-based system instance 312 |

| Perform a replication check between databases in the cloud-based system instances 314 |

| Reconcile transaction messages to identify anomalies 316 |

AUTOMATIC TRANSACTION PROCESSING FAILOVER AND RECONCILIATION

RELATED APPLICATIONS

This application claims priority to U.S. Provisional Patent Application No. 63/540,459, filed on Sep. 26, 2023, the entirety of which is incorporated by reference herein.

TECHNICAL FIELD

This application relates generally to methods and apparatuses, including computer program products, for automatic transaction processing failover and reconciliation in a cloud-based environment.

BACKGROUND

Modern high-throughput transaction computing systems (like securities trading platforms) are typically built to minimize latency and maximize transaction throughput. These computing systems leverage advanced computing systems such as cloud-based environments to achieve the scalability and processing power to deliver on the transaction processing requirements. As a result, the accuracy and availability of post-transaction processing systems is critical. Even though such post-transaction processing systems are part of middle- and/or back-office functions, these systems must be able to complete transaction post-processing steps in real-time to ensure that transactions are properly recorded and to deliver the best customer experience. Increasing volatility with dynamically changing transaction behaviors reinforce the criticality of these systems, which must be available to handle significant transaction workloads at all hours.

To accomplish these goals, post-transaction processing systems are typically built upon an event-driven streaming paradigm, with one or more cloud regions communicating with on-premise infrastructure. However, event-driven streaming can expose applications to significant resiliency and reliability challenges. Any instability or outage in this environment can quickly escalate into not only a poor customer experience, but also the risk of transaction loss.

SUMMARY

Therefore, what is needed are methods and systems for executing a post-transaction processing workload in a cloud-based environment with automatic failover between regions that minimizes system disruption or transaction loss when an unexpected failure occurs in a given region. The techniques described herein provide for a high-throughput, high-volume, low latency event streaming infrastructure that advantageously enables failover switching to ensure uninterrupted availability of critical post-transaction processing systems. The methods and systems described herein advantageously enable the following improvements:

1) Region affinity on each transaction;
2) Event sourcing to track messages within the transaction processing workload;
3) Traceability of transactions and events to monitor and replay messages;
4) Environment-wide health monitoring to detect errors within a region and automatically initiate failover switch based upon exception thresholds;
5) State switching to broadcast the change in state to appropriate services across a region; and 6) Seamless failover processing to provide robust transaction reconciliation and error remediation.

The invention, in one aspect, features a system for automatic transaction processing failover and reconciliation in a cloud-based environment. The system includes a plurality of cloud-based system instances each comprising (i) one or more server computing devices configured to process transaction messages received from one or more remote computing devices and (ii) a database configured to store the transaction messages. Each cloud-based system instance monitors the processing of the transaction messages to identify one or more exception events and determines whether to initiate a failover switch based upon the identified exception events. When a failover switch is initiated for an affected cloud-based system instance, the system identifies a target cloud-based system instance for the failover switch, changes a state of the affected cloud-based system instance to prevent the affected cloud-based system instance from receiving transaction messages, changes a state of the target cloud-based system instance to receive transaction messages intended for the affected cloud-based system instance, and performs a replication check between the database in the affected cloud-based system instance and the database in the target cloud-based system instance. The system reconciles transaction messages stored in the database of the affected cloud-based system instance to identify anomalies.

The invention, in another aspect, features a computerized method of automatic transaction processing failover and reconciliation in a cloud-based environment. A plurality of cloud-based system instances each comprising one or more server computing devices that process transaction messages received from one or more remote computing devices and store the transaction messages in a database. Each cloud-based system instance monitors the processing of the transaction messages to identify one or more exception events and determines whether to initiate a failover switch based upon the identified exception events. When a failover switch is initiated for an affected cloud-based system instance, the cloud-based system instance identifies a target cloud-based system instance for the failover switch, changes a state of the affected cloud-based system instance to prevent the affected cloud-based system instance from receiving transaction messages, changes a state of the target cloud-based system instance to receive transaction messages intended for the affected cloud-based system instance, and performs a replication check between the database in the affected cloud-based system instance and the database in the target cloud-based system instance. The affected cloud-based system instance reconciles transaction messages stored in the database of the affected cloud-based system instance to identify anomalies.

Any of the above aspects can include one or more of the following features. In some embodiments, monitoring the processing of the transaction messages to identify one or more exception events comprises performing a database health check on the database; and identifying an exception event when the database health check fails. In some embodiments, monitoring the processing of the transaction messages to identify one or more exception events comprises analyzing the transaction messages to identify exception events including one or more of: duplicate transactions, dead-letter messages, and system kickouts. In some embodiments, monitoring the processing of the transaction messages to identify one or more exception events comprises calculating an end-to-end processing time for one or more transaction messages corresponding to a single transaction;

and identifying an exception event when the end-to-end processing time exceeds a threshold value.

In some embodiments, determining whether to initiate a failover switch based upon the identified exception events comprises comparing one or more attributes of the identified exception events to one or more failover threshold values; and determining to initiate a failover switch based upon the comparison. In some embodiments, identifying a target cloud-based system instance for the failover switch comprises requesting a target cloud-based system instance from an orchestration service. In some embodiments, the target cloud-based system instance is assigned to a different region of the cloud-based environment than the affected cloud-based system instance.

In some embodiments, performing a replication check between the database in the affected cloud-based system instance and the database in the target cloud-based system instance comprises determining that each of a plurality of transaction messages from the database in the affected cloud-based system instance are also contained in the database in the target cloud-based system instance. In some embodiments, each transaction message is associated with a message topic. In some embodiments, changing a state of the target cloud-based system instance to receive transaction messages intended for the affected cloud-based system instance comprises enabling the target cloud-based system instance to receive transaction messages with a message topic assigned to the affected cloud-based system instance.

In some embodiments, reconciling transaction messages stored in the database of the affected cloud-based system instance to identify anomalies comprises grouping transaction messages received from the remote computing devices into one or more ingress transactions; grouping transaction messages processed by the cloud-based system instance into one or more egress transactions; determining whether the number of ingress transactions match the number of egress transactions; and generating an alert notification for transmission to a client computing device when the number of ingress transactions does not match the number of egress transactions. In some embodiments, the target cloud-based system instance reverts the failover switch upon determining that the affected cloud-based system instance is able to resume transaction processing.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is a flow diagram of a method of automatic transaction processing failover and reconciliation in a cloud computing environment.

DETAILED DESCRIPTION

Figure 1:
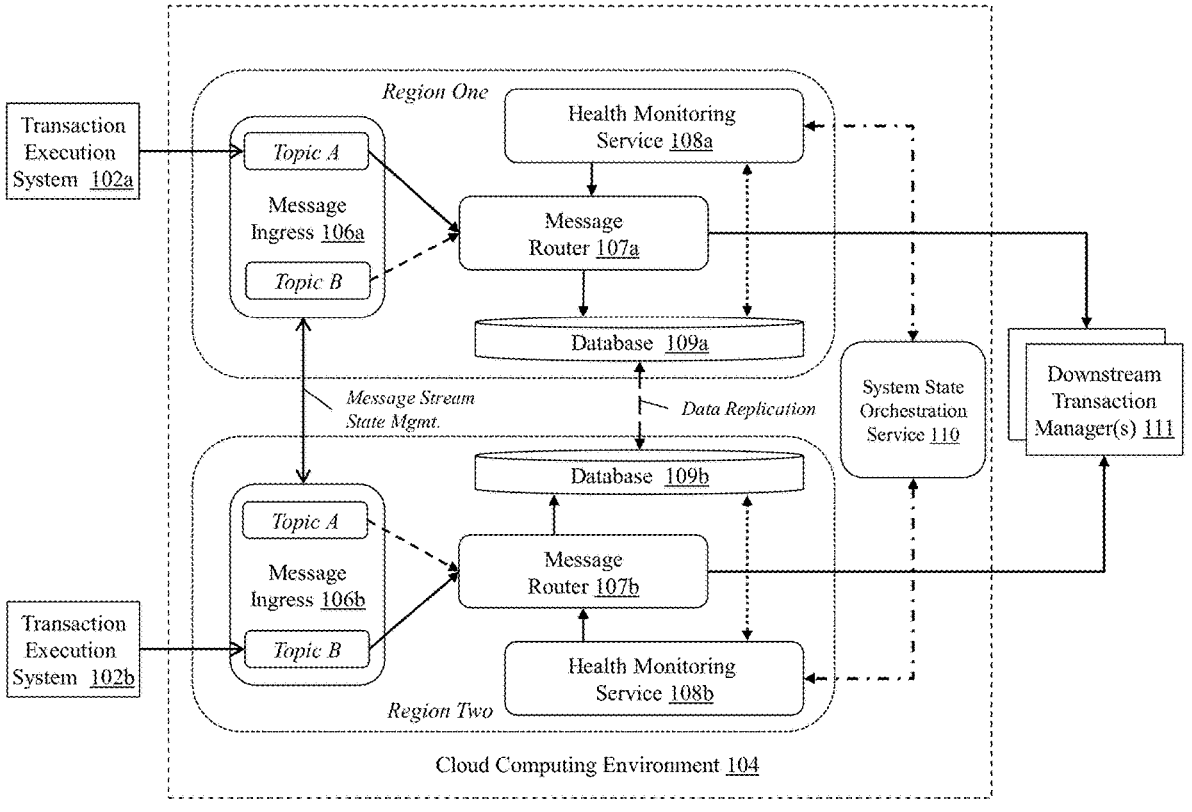
FIG. 1 is a block diagram of a system for automatic transaction processing failover and reconciliation in a cloud computing environment.

FIG. 1 is a block diagram of system 100 for automatic transaction processing failover and reconciliation in a cloud computing environment. System 100 includes a plurality of transaction execution systems 102a-102b that is coupled to cloud computing environment 104. Cloud computing environment 104 comprises a plurality of regions (Region One and Region Two) that each include a message ingress module 106a-106b, a message router 107a-107b, a health monitoring service 108a-108b, and a database 109a-109b. Cloud computing environment 104 also includes a system state orchestration service 110. System 100 also includes one or more downstream transaction manager computing devices 111 coupled to the cloud computing environment 104.

Transaction execution systems 102a-102b each comprises one or more computing devices (such as server computing devices) that are coupled to cloud computing environment 104 and which execute one or more high-speed, high-throughput transactions (such as trades of financial instruments) based upon execution signals received from, e.g., one or more remote computing devices (not shown). For example, the remote computing devices can issue a transaction signal (e.g., instructions to execute a trade) along with a trade price, trade quantity, and/or other data such as user identifier, account identifier, etc., to one of transaction execution systems 102a-102b. Transaction execution systems 102a-102b perform one or more transactions (e.g., buy transactions, sell transactions, asset transfer transactions, and the like) in order to carry out the trade identified in the trading signal. Exemplary transaction execution systems 102a-102b include but are not limited to an order management system of a brokerage trading platform or an institutional trading system. Upon completion of a trade or other transaction(s), the transaction execution systems 102a-102b can transmit a message to cloud computing environment 104 corresponding to details of the trade for initiation of post-trade processing and reconciliation. It should be appreciated that transaction execution systems 102a-102b are not limited to financial instrument trading and can correspond to any number of computing transaction processing and/or event processing systems where post-transaction processing and/or reconciliation may be required.

In some embodiments, transaction execution systems 102a-102b are coupled to cloud computing environment via a communication network—such as an intranet, the Internet, and/or a cellular network. As can be appreciated, the communication network can be comprised of several discrete networks and/or sub-networks. In some embodiments, all or part of transaction execution systems 102a-102b are integrated into cloud computing environment.

Cloud computing environment 104 is a combination of hardware, including one or more computing devices comprised of special-purpose processors and one or more physical memory modules, and specialized software—such as message ingress modules 106a-106b, message routers 107a, 107b, health monitoring services 108a-108b, databases 109a, 109b, and orchestration service 110—that are executed by processor(s) of the server computing devices in cloud computing environment 104, to receive data from other components of system 100, transmit data to other components of system 100, and perform functions for automatic transaction processing failover and reconciliation in a cloud-based environment as described herein. Generally, and without limitation, the computing resources of cloud computing environment 104 can be distributed into a plurality of regions (Region One and Region Two of FIG. 1) which are defined according to certain geographic and/or technical performance requirements. Each region can comprise one or more datacenters connected via a regional network that meets specific low-latency requirements. Inside each region, cloud computing environment 104 can be partitioned into one or more availability zones (AZs), which are physically separate locations used to achieve tolerance to, e.g., hardware failures, software failures, disruption in connectivity, unexpected events/disasters, and the like. Typically, the availability zones are connected using a high-performance network (e.g., round trip latency of less than two milliseconds). It should be appreciated that other types of computing resource distribution and configuration in a cloud environment can be used within the scope of the technology described herein.

As noted above, each region comprises message ingress module 106a-106b, message router 107a-107b, health monitoring service 108a-108b, and database 109a-109b. In some embodiments, one or more of these computing elements can comprise virtual computing resources, e.g., software modules such as a container that includes a plurality of files and configuration information (i.e., software code, environment variables, libraries, other dependencies, and the like) and one or more database instances (i.e., data files and/or a local database). In one embodiment, cloud computing environment 104 is deployed using a commercially-available cloud computing platform. Exemplary cloud computing platforms include, but are not limited to: Amazon Web Services™ (AWS), Microsoft Azure™, and IBM Cloud™, among others.

In some embodiments, elements 106a-106b, 107a-107b, 108a-108b, 109a-109b, and 110 are specialized sets of computer software instructions programmed onto one or more dedicated processors of server computing device(s) in cloud computing environment 104 and can include specifically-designated memory locations and/or registers for executing the specialized computer software instructions. It should be appreciated that any number of computing devices, arranged in a variety of architectures, resources, and configurations (e.g., cluster computing, virtual computing, cloud computing) can be used without departing from the scope of the invention. The exemplary functionality of elements 106a-106b, 107a-107b, 108a-108b, 109a-109b, and 110 is described in detail throughout this specification.

System 100 also includes one or more downstream transaction managers 111 which are each computing devices configured to receive messages that include transaction details from cloud computing environment 104 for subsequent processing. For example, downstream transaction managers 111 can comprise a system that carries out one or more processing steps to complete the transactions, such as transferring funds, crediting or debiting accounts, updating transaction records, and the like.

Figure 2:
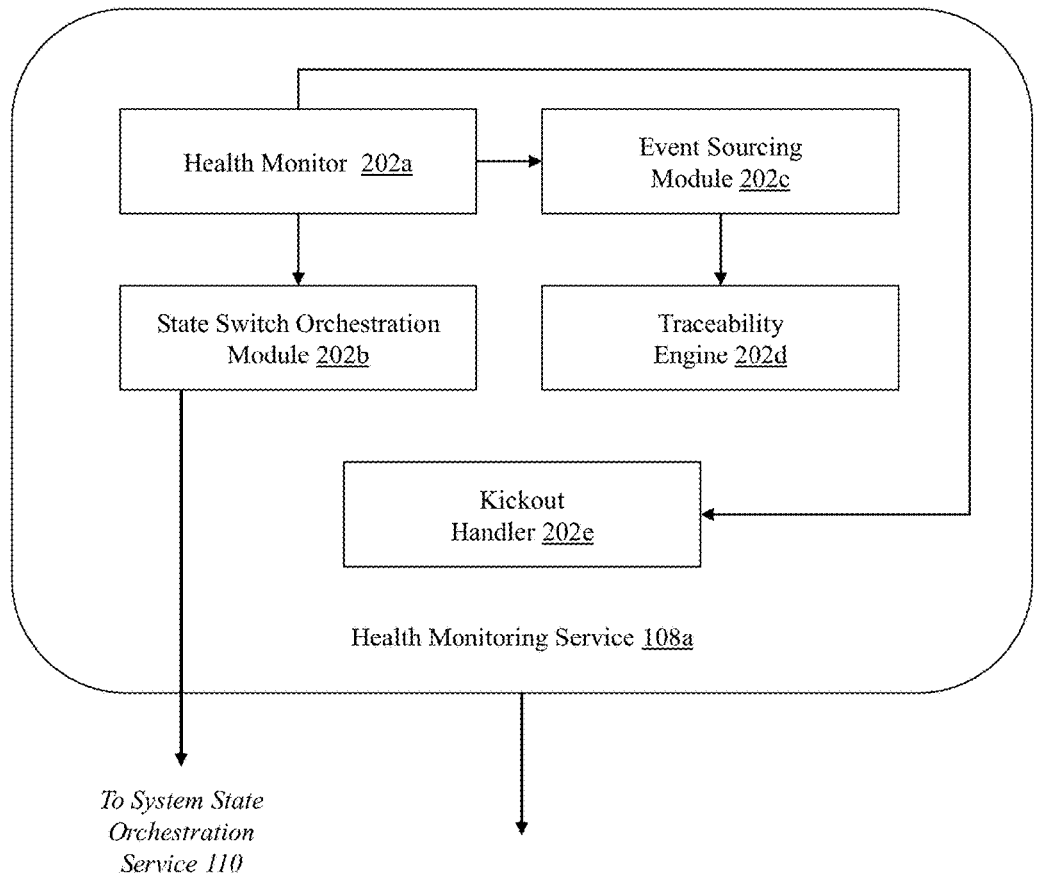
FIG. 2 is a detailed block diagram of a health monitoring service used for automatic transaction processing failover and reconciliation in a cloud computing environment.

FIG. 2 is a detailed block diagram of event monitoring service module 108a of FIG. 1. It should be appreciated that health monitoring service 108b comprises the same elements as service 108a shown in FIG. 2. Event monitoring service 108a comprises a plurality of computing modules, including health monitor 202a, state switch orchestration module 202b, event sourcing module 202c, traceability engine 202d, and kickout handler 202e.

FIG. 3 is a flow diagram of a computerized method 300 of flow diagram of a method of automatic transaction processing failover and reconciliation in a cloud computing environment, using system 100 of FIG. 1. During operation of system 100, transaction execution systems 102a-102b transmit messages to the corresponding message ingress modules 106a-106b in cloud computing environment. As shown in FIG. 1, transaction execution system 102a transmits messages to message ingress module 106a, while transaction execution system 102b transmits messages to message ingress module 106b. In some embodiments, the messages comprise data elements associated with transactions executed by systems 102a-102b (e.g., trade transactions).

In some embodiments, systems 102a-102b capture transaction data in real time and communicate the messages to message ingress modules 106a-106b using an event streaming platform. An exemplary event streaming platform that can be deployed in system 100 is Apache Kafka® available from Apache Software Foundation. Generally, transaction execution systems 102a-102b act as 'producers' in the event streaming platform, in that systems 102a-102b capture events corresponding to the executed transactions and publish the events to the event streaming platform. Message ingress modules 106a-106b act as 'consumers' in the event streaming platform, in that modules 106a-106b subscribe to certain events in the event streaming platform and receive and process the subscribed events. As consumers, each message ingress module 106a-106b is configured to receive messages designated according to one or more message topics. Generally, topics are used to organize and store messages; for example, messages can be sent by producers to a given topic and the event streaming platform appends the messages one after another to create a log file. Consumers can pull messages from a specific topic for processing. In some embodiments, each message comprises a key, a value, a timestamp, and one or more optional metadata headers.

As shown in FIG. 1, each message ingress module 106a-106b is configured to subscribe to messages for a plurality of topics (i.e., Topic A and Topic B). During regular operation, however, each module 106a-106b receives messages for a given topic from one of the systems 102a-102b. Specifically, message ingress module 106a receives messages for Topic A from transaction execution system 102a and message ingress module 106b receives messages for Topic B from transaction execution system 102b. In some embodiments, message ingress module 106a-106b performs one or more processing steps on each received message, such as validating one or more of the data fields or headers in the message (e.g., confirming there are no null values), checking that the complete message was received, among others. As part of the event streaming platform, message ingress modules 106a-106b are connected to each other for the purpose of message stream state management, which will be described in detail below.

Message ingress modules 106a-106b transmit the received messages to the corresponding message router 107a-107b. Message routers 107a-107b determine one or more downstream transaction managers 111 to which each message should be transmitted. For example, message router 107a-107b can analyze one or more data fields in each message and/or group of messages that comprise a transaction, and determine a downstream transaction manager 111 to which the messages should be routed. An exemplary data field can be a transaction label, a transaction execution system identifier, a transaction type, a message topic, or another type of data field that indicates a destination downstream transaction manager 111 to router 107a-107b.

As messages are being processed by message router 107a-107b, health monitor 202a of health monitoring service 108a-108b monitors (step 302 of FIG. 3) the processing of the transaction messages by the corresponding router 107a-107b to identify one or more exception events. Generally, an exception event can comprise (without limitation) a transaction integrity failure, a system hardware/software failure, a network failure, or a data processing/storage failure. Health monitoring service 108a-108b performs a series of exception checks to verify the health of the transaction pipeline in cloud computing environment 104, to ensure that the environment is processing the transaction data and routing the transaction data to downstream transaction managers 111 at the right time. If health monitor 202a in a particular cloud region discovers one or more exception events, health monitor 202a can compare the events to pre-configured threshold values and if necessary, initiate a failover to another cloud region to maintain uninterrupted transaction processing. In some embodiments, the checks can include end-to-end latency, kickouts, cloud region hardware instability, database unavailability, duplicate transactions, and messaging platform issues (e.g., schema issues, payload issues). In some embodiments, the pre-configured threshold values are dynamically updatable based upon any of a variety of factors (e.g., time of day, day of week, predicted transaction volume, actual transaction volume, etc.). Each of these exception checks is described in detail below.

Database Health Exceptions—health monitor 202a of health monitoring service 108a-108b periodically checks the health of corresponding database 109a-109b to determine that the databases are online and transaction data is being stored properly. In some embodiments, health monitor 202a initiates a health check query against the corresponding database 109a-109b to perform tasks such as validating connection requests, confirming successful receipt and storage of data, analyzing database logs to identify errors, verifying row counts in certain tables, etc. When the health check query returns a successful completion, health monitor 202a can wait for a predetermined period of time and then initiate another health check query. For example, monitor 202a can execute a health check query against database 109a-109b every thirty seconds. In the case where the health check query detects a problem with database 109a-109b, health monitor 202a can retry the health check query one or more additional times to verify that the problem persists. In one example, service 108a-108b is configured with a retry threshold of three, which means that if the health check query fails three or more times consecutively, monitor 202a can determine that a transaction failover switch should be initiated from one region in cloud computing environment 104 to another region.

Exemplary pseudocode for performing a database health check is provided below:

```
Every 30 secs DO:
    STEP 1:
        EXECUTE DATABASE_HEALTH_CHECK Query
        EXIT on Success
        ELSE Go to Step 2
```

-continued

```
STEP 2:
    UPDATE Retry Count
    IF Retry Count < 3
        WAIT 3 Seconds
        THEN GO TO STEP 1:
    ELSE
        GO TO STEP 3:
STEP 3:
    TRIGGER Failover Process
```

Dead Letter Exceptions—health monitor 202a can configure a dead letter queue (either as part of the event streaming platform or separately) which stores messages from event streaming platform that cannot be processed successfully due to an issue with the formation or content of the message. In some embodiments, one or more messages received by message ingress module 106a-106b and message router 107a-107b from transaction execution system 102a-102b may be malformed (e.g., an incorrect message format) and/or have missing or invalid message content. Instead of stopping the message processing pipeline due to invalid messages, message ingress module 106a-106b or message router 107a-107b can store the invalid messages in a dead letter queue. Health monitor 202a can analyze the dead letter queue to determine whether an exception event exists that should trigger a failover.

For example, monitor 202a can periodically determine a count of messages stored in the dead letter queue since the previous dead letter check and compare this value against a dead letter spike threshold. When the count of messages meets or exceeds the spike threshold, monitor 202a can determine that a transaction failover switch should be initiated from one region in cloud computing environment 104 to another region. The spike threshold check can be performed frequently (e.g., every ten seconds) during a time period in which a transaction market is open—and during which a higher volume of transactions is expected. The spike threshold check can be performed less frequently (e.g., every thirty seconds) during a time period in which the transaction market is closed—and during which a lower volume of transactions is expected. For example, when health monitor 202a determines that seventy-five messages have been stored in the dead letter queue over the last ten seconds and the spike threshold is fifty messages, it could indicate an issue with the transaction execution system 102a-102b and/or the event streaming platform that is delivering the messages to cloud computing environment 104. As a result, monitor 202a initiates a failover.

In another example, monitor 202a can periodically determine a count of messages stored in the dead letter queue for the current day and compare the count against a daily dead letter threshold. When the count of messages meets or exceeds the daily threshold, monitor 202a can determine that a transaction failover switch should be initiated. For example, health monitor 202a can check the daily dead letter count every five minutes during a given time period (e.g., 8:00 am to 5:00 pm) and when the daily threshold is met, monitor 202a can trigger a failover.

Exemplary pseudocode for performing a dead letter exception check is provided below:

```
EXECUTE every 10 secs during market open timeframe DO:
EXECUTE every 30 secs during non-market open timeframe DO:
   STEP 1:
      GET new DEAD_LETTER_MESSAGE_COUNT from database (count since
the previous dead letter check)
      GET DEAD_LETTER_SPIKE_THRESHOLD from application config
      IF DEAD_LETTER_MESSAGE_COUNT < DEAD_LETTER_SPIKE_THRESHOLD
(dynamically updatable)
      THEN
         EXIT
      ELSE
         GO TO STEP 2:
   STEP 2:
      TRIGGER Failover Process
EXECUTE every 5 mins DO:
   STEP 1:
      GET total DEAD_LETTER_MESSAGE_COUNT from database for the
given day
      GET DEAD_LETTER_PER_DAY_THRESHOLD from application config
      IF DEAD_LETTER_MESSAGE_COUNT < DEAD_LETTER_PER_DAY_THRESHOLD
(dynamically updatable)
      THEN
         EXIT
      ELSE
         GO TO STEP 2:
   STEP 2:
      TRIGGER Failover Process
```

Kickout Exceptions—health monitor 202a can configure a kickout queue (either as part of the event streaming platform or separately) which stores messages from the event streaming platform that correspond to transactions that cannot be processed due to an inconsistency or error with the transaction. In some embodiments, one or more messages received by message ingress module 106a-106b and message router 107a-107b from transaction execution system 102a-102b are associated with transactions that did not complete successfully due to an issue with the transaction data elements or parameters (e.g., logical inconsistency, negative values, unmatching sides of a transaction). Instead of stopping the message processing pipeline due to invalid transactions, message ingress module 106a-106b or message router 107a-107b can store the corresponding messages in a kickout queue. Health monitor 202a can analyze the kickout queue to determine whether an exception event exists that should trigger a failover.

For example, monitor 202a can periodically determine a count of messages stored in the kickout queue since the previous dead letter check and compare this value against a kickout spike threshold. When the count of messages meets or exceeds the kickout spike threshold, health monitor 202a can determine that a transaction failover switch should be initiated from one region in cloud computing environment 104 to another region. The kickout spike threshold check can be performed frequently (e.g., every ten seconds) during a time period in which a transaction market is open—and during which a higher volume of transactions is expected. The kickout spike threshold check can be performed less frequently (e.g., every thirty seconds) during a time period in which the transaction market is closed—and during which a lower volume of transactions is expected. For example, when monitor 202a determines that thirty-seven messages have been stored in the kickout queue over the last ten seconds and the kickout spike threshold is eight messages, it could indicate an issue with the transaction execution system 102a-102b and/or the event streaming platform that is delivering the messages to cloud computing environment 104. As a result, monitor 202a initiates a failover.

In another example, monitor 202a can periodically determine a count of messages stored in the kickout queue for the current day and compare the count against a daily kickout threshold. When the count of messages meets or exceeds the daily kickout threshold, health monitor 202a can determine that a transaction failover switch should be initiated. For example, monitor 202a can check the daily kickout count every five minutes during a given time period (e.g., 8:00 am to 5:00 pm) and when the daily kickout threshold is met, monitor 202a can trigger a failover.

Exemplary pseudocode for performing a kickout exception check is provided below:

```
EXECUTE every 10 secs during market open timeframe DO:
EXECUTE every 30 secs during non-market open timeframe DO:
   STEP 1:
      GET new SYSTEM_KICKOUT_TRADE_COUNT from database (count since
the previous check)
      GET SYSTEM_KICKOUT_SPIKE_THRESHOLD from application config
      IF SYSTEM_KICKOUT_TRADE_COUNT <
SYSTEM_KICKOUT_SPIKE_THRESHOLD (dynamically updatable)
      THEN
         EXIT
      ELSE
         GO TO STEP 2:
   STEP 2:
      TRIGGER Failover Process
EXECUTE every 5 mins DO:
   STEP 1:
```

-continued

```
    GET total SYSTEM_KICKOUT_TRADE_COUNT from database for the
given day
    GET SYSTEM_KICKOUT_PER_DAY_THRESHOLD from application config
    IF SYSTEM_KICKOUT_TRADE_COUNT <
SYSTEM_KICKOUT_PER_DAY_THRESHOLD (dynamically updatable)
    THEN
       EXIT
    ELSE
       GO TO STEP 2:
  STEP 2:
    TRIGGER Failover Process
```

Duplicate Event Exceptions—health monitor 202a can configure a duplicate trade queue (either as part of the event streaming platform or separately) which stores messages from the event streaming platform that correspond to duplicate transactions (i.e., two or more individual transactions received immediately one after another or in quick succession, and which each comprise the same transaction details). In some embodiments, one or more messages received by message ingress module 106a-106b and message router 107a-107b from transaction execution system 102a-102b are associated with the same transaction. When a plurality of duplicate transaction events occur within a defined time period, it can indicate a problem with transaction execution systems 102a-102b and/or the event streaming platform that is delivering the messages to cloud computing environment 104.

For example, monitor 202a can periodically determine a duplicate transaction count for a defined time window (e.g., twenty-five seconds) and compare this value against a duplicate transaction threshold. When the duplicate transaction count during the defined time window meets or exceeds the duplicate transaction threshold, monitor 202a can determine that a transaction failover switch should be initiated from one region in cloud computing environment 104 to another region. In some embodiments, the duplicate transaction threshold check can be performed periodically (e.g., every one minute). When health monitor 202a determines that twelve duplicate transactions are detected during the twenty-five second window and the duplicate transaction threshold is four messages, it could indicate an issue with the transaction execution system 102a-102b and/or the event streaming platform that is delivering the messages to cloud computing environment 104. As a result, monitor 202a initiates a failover.

Exemplary pseudocode for performing a duplicate transaction exception check is provided below:

cessing time of the transactions. In some embodiments, transaction bottlenecking or improper load balancing, system errors, hardware malfunctions, or network latency issues occurring in the transaction execution systems 102a-102b, the event streaming system, and/or the message ingress modules 106a-106b of a given cloud region can cause transaction throughput to decrease and/or processing time for each transaction to increase. Health monitor 202a can analyze certain metrics associated with transaction throughput and processing time to determine whether an exception event is occurring.

For example, monitor 202a can periodically determine a count of processed transactions for a defined time window (e.g., two minutes) and compare this value against a transaction count threshold. When the count of processed transactions during the defined time window falls below the transaction count threshold, it can indicate that the system is experiencing an issue that results in fewer transactions being processed than expected. Based upon this evaluation, health monitor 202a can determine that a transaction failover switch should be initiated from one region in cloud computing environment 104 to another region. In another example, monitor 202a can periodically compare an average processing time of transactions during the given time window (e.g., by reviewing timestamp metadata stored in the messages for each transaction) and determine whether the average processing time is higher than a defined tolerance threshold. When the average processing time exceeds the tolerance threshold, it can indicate that the system is not able to process transactions at to a minimum or optimal speed due to, e.g., hardware or software issues affecting latency. Based upon this evaluation, monitor 202a can determine that a transaction failover switch should be initiated from one region in cloud computing environment 104 to another region.

```
EXECUTE every 1 minute
  STEP 1:
      GET THRESHOLD_DUPLICATE_TRADE_COUNT from application config
      GET SCAN_WINDOW_TIME from application config
      GET DUPLICATE_TRADE_COUNT from database for the given
SCAN_WINDOW_TIME
      IF DUPLICATE_TRADE_COUNT < THRESHOLD_DUPLICATE_TRADE_COUNT
      THEN
         GO TO STEP 2:
      ELSE
         EXIT
      STEP 2:
      TRIGGER Failover Process
```

End-to-End Processing Time Exceptions—health monitor 202a can analyze a count of transactions that occurred within a pre-determined time window and an average pro- In some embodiments, the end-to-end processing time check can be performed frequently (e.g., every five seconds) during a time period in which a transaction market is open—and during which a higher volume of transactions is expected. The end-to-end processing time check can be performed less frequently (e.g., every thirty seconds) during a time period in which the transaction market is closed—and during which a lower volume of transactions is expected.

Exemplary pseudocode for performing an end-to-end processing time check is provided below:

```
EXECUTE every 5 secs during market open timeframe DO:
EXECUTE every 30 secs during non-market open timeframe DO:
   STEP 1:
      GET THRESHOLD_COUNT And PROCESS_TIME_THRESHOLD from
Application Config for the respective timeframe
      GET ACTUAL_COUNT of Trades for the corresponding Scan Window
      IF ACTUAL_COUNT is Less than or Equal to THRESHOLD_COUNT:
         THEN
            GO TO STEP 2:
      ELSE
         EXIT
STEP 2:
   TRIGGER Failover Process
EXECUTE every 5 secs during market open timeframe DO:
EXECUTE every 30 secs during non-market open timeframe DO:
   STEP 1:
      GET ACTUAL_PROCESS_TIME of Trades for the corresponding Scan
Window
      IF ACTUAL_PROCESS_TIME is Greater than or Equal to
PROCESS_TIME_THRESHOLD:
         THEN
            GO TO STEP 2:
      ELSE
         EXIT
STEP 2:
   TRIGGER Failover Process
```

It should be appreciated that health monitoring service 108a-108b can identify a plurality of exception events for a given transaction period. For example, a variety of system problems may occur simultaneously, which can result in both end-to-end processing time exceptions and dead letter transaction exceptions. Health monitoring service 108a-108b can determine whether to initiate a failover switch based upon each exception event independently and/or an aggregation of exception events. For example, the exception events can be assigned a severity level—where higher severity exceptions trigger a failover as soon as they are detected (regardless of other exception events occurring), and lower severity exceptions trigger a failover only when they reach a certain threshold and/or when they are combined with other exception events occurring at the same time.

Turning back to FIG. 3, health monitor 202a of service 108a-108b determines (step 304) whether to initiate a failover switch based upon the identified exception event(s) as described above. When health monitor 202a determines that a failover switch should be initiated for a particular cloud-based system instance (e.g., region) in the cloud computing environment 104, health monitor 202a of service 108a-108b in the given system instance (step 306) identifies a target cloud-based system instance (aka region) for the failover switch. In some embodiments, health monitor 202a communicates with system state orchestration service 110 to identify the target cloud-based system instance. Service 110 can contain a list of available system instances and provide an identification of a suitable target system instance back to health monitor 202a of service 108a. In some embodiments, health monitor 202a is pre-configured with an identification of a target cloud-based system instance and automatically selects that target cloud-based system instance.

As an example, an issue in Region One of environment 104 may result in exception events being detected by health monitor 202a of service 108a. Health monitor 202a triggers a failover switch and identifies a target cloud-based system instance (i.e., Region Two) for the failover. Health monitor 202a initiates the failover switch by executing two actions: (i) activating state switch orchestration module 202b to coordinate state changes for each region (steps 310 and 312) as well as message switching and (ii) performing a replication check (step 314) between database 109a in Region One and database 109b in the target system instance (Region Two).

In some embodiments, to initiate the failover switch, health monitor 202a transmits a current region status (e.g., 'failover initiated') to state switch orchestration module 202b-which, in turn, communicates the status to system state orchestration service 110. System state orchestration service 110 coordinates state changes and message failover switching between the system instances. Orchestration service 110 changes a state (step 308) of the affected cloud-based system instance (Region One) to prevent the cloud-based system instance from receiving transaction messages and communicates the state change to state switch orchestration module 202b in the affected region. In some embodiments, orchestration service 110 changes the state of Region One to 'inactive.' Based upon the state change, health monitor 202a instructs message router 107a in Region One to stop consuming inbound messages from message ingress module 106a (e.g., messages from Topic A).

Similarly, orchestration service 110 changes a state (step 310) of the target cloud-based system instance (Region Two) to receive transaction messages intended for the affected cloud-based system instance (Region One). In some embodiments, orchestration service 110 changes the state of Region One to 'single region.' Based upon the state change, health monitor 202a of service 108b instructs message router 107b in Region Two to start consuming inbound messages from message ingress module 106a for both Topic A and Topic B.

Figure 4:
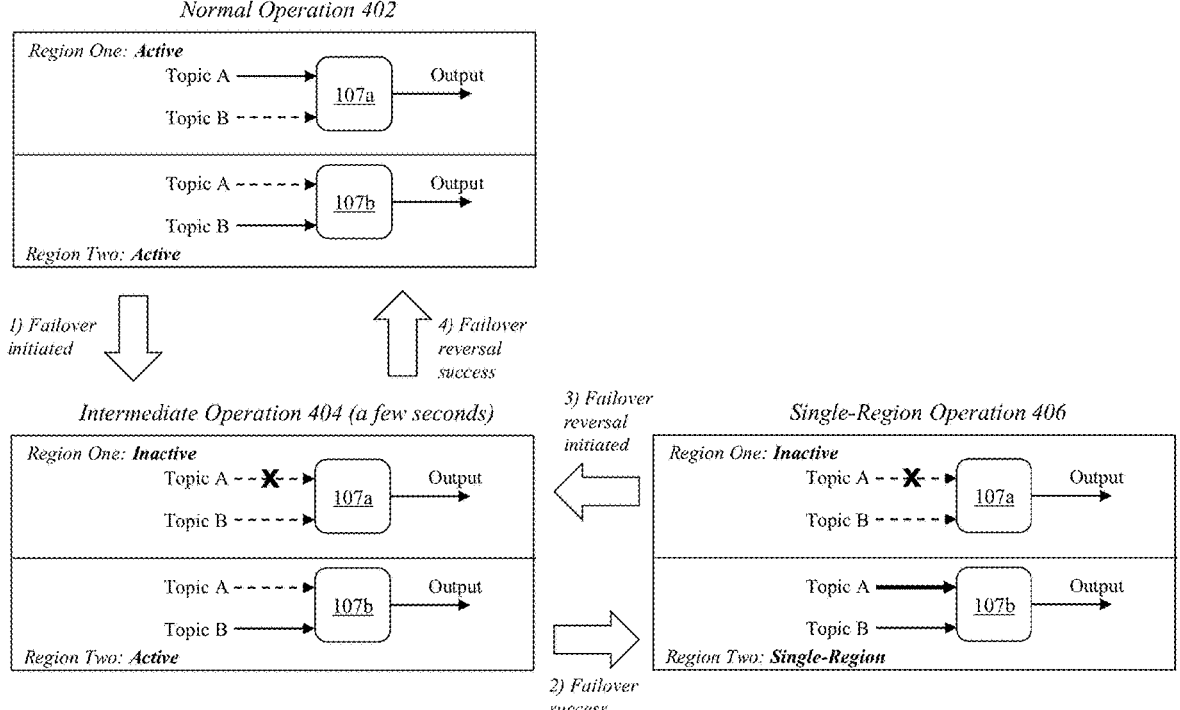
FIG. 4 is a diagram of a state transition workflow for a failover switch between regions of a cloud computing environment.

FIG. 4 is a diagram of a state transition workflow 400 for a failover switch between regions of a cloud computing environment, using system 100 of FIG. 1. As shown in block

402 of FIG. 4, in normal operation, message router 107a in Region One receives messages for Topic A while message router 107 in Region Two receives messages for Topic B. At this point, the status for both Region One and Region Two is set to 'Active.'

When health monitoring service 108a in Region One detects exception events and initiates a failover switch (step 1), orchestration service 110 changes the state of Region One to 'inactive,' which instructs message router 107a of Region One to stop receiving messages on Topic A (denoted by the X symbol in block 404). Orchestration service 110 has not yet changed the state of Region Two, so message router 107b is not receiving messages on Topic A. It should be noted that the intermediate operation mode 404 lasts for only a few seconds.

Then, at step 2, orchestration service 110 changes the state of Region Two to 'single-region,' which instructs message router 107b of Region Two to start receiving messages on Topic A (in addition to continuing to receive messages on Topic B). The single-region mode (block 406) enables system 100 to receive and process messages on Topic A and Topic B without interruption due to the failure of Region One.

After any problems or errors in Region One are corrected, orchestration service 110 can proceed to bring Region One back into operation by reversing the failover switch. At step 3, orchestration service 110 initiates a failover reversal by changing the state of Region Two to 'active,' which instructs message router 107b of Region Two to stop receiving messages on Topic A. As above, orchestration service 110 has not yet changed the state of Region One, so message router 107a is not receiving messages on Topic A. Again, the intermediate operation mode 404 only lasts for a few seconds. At step 4, orchestration service 110 changes the state of Region One to 'active,' which instructs message router 107a to begin receiving messages on Topic A once again.

As mentioned above, once the failover switch is initiated, health monitor 202a of service 108a in the affected region the replication check performed by health monitor 202a comprises a check to determine if all transaction records from database 109a in the unhealthy region (Region One) have been replicated to database 109b in the healthy region (Region Two). When the records match between the two databases 109a-109b, health monitor 202a can transmit a message to orchestration service 110 indicating that the failover switch is successful and message router 107b in the healthy region can continue processing messages on Topics A and B. When the records do not match, it could indicate that message router 107a is still processing messages received on Topic A during the failover switch. Health monitor 202a can wait for a predetermined period of time and perform the replication check again. However, if health monitor 202a attempts the replication check several times (e.g., three) without confirming that the records match, this could indicate that some transaction messages were not properly replicated. In this case, health monitor 202 of service 108a can transmit an alert message to one or more remote computing devices of technicians or administrative staff for investigation and remediation.

Another important aspect of failover switching as performed by system 100 is the post-failover reconciliation process. In some embodiments, health monitor 202a of service 108a-108b reconciles (step 316 of FIG. 3) transaction messages to identify anomalies and determine whether transactions were successfully completed in the region that failed (i.e., Region One in the above example). The event reconciliation process can include an analysis of total number of events/transactions received t ingress module 106a-106b and total number of events/transactions transmitted to downstream transaction manager 111. When the total number of ingress events and output events do not match, monitor 202a can transmit alerts to remote computing devices for investigation and analysis.

Figure 5:
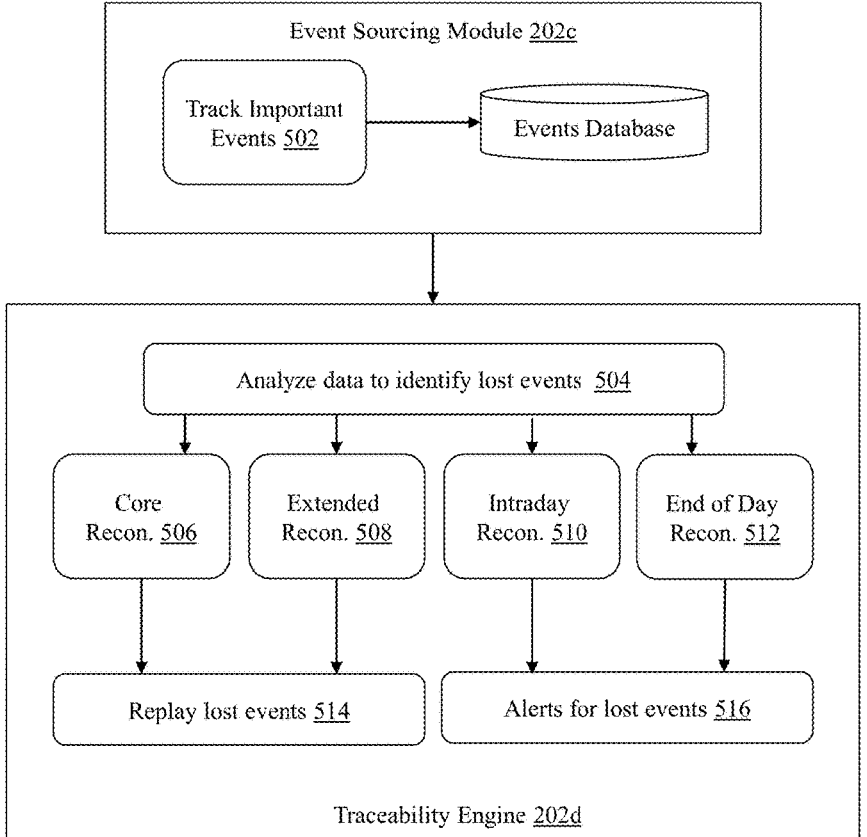
FIG. 5 is a diagram of a reconciliation and anomaly identification workflow after a failover switch between regions of a cloud computing environment.

Exemplary pseudocode performing ingress/output reconciliation is provided below:

```
ON Successful Failover
EXECUTE in Failed Region
STEP 1:
    GET TOTAL_INGRESS_TRADE_COUNT from Database
    GET TOTAL_EGRESS_TRADE_COUNT from Database
    IF TOTAL_INGRESS_TRADE_COUNT != TOTAL_EGRESS_TRADE_COUNT
    THEN
        GET UNPROCESSED_RECORDS_COUNT from database
        GET TOTAL_RECORDS_COUNT from database
        GET TOTAL_ RECORDS_ PROCESSED_NEXTGEN_COUNT from database
        GET TOTAL_ RECORDS_ PROCESSED_MAINFRAME_COUNT from database
        GET TOTAL_ RECORDS_ PROCESSED_FAILOVER_TRACKING_COUNT from
database
        SEND EMAIL_ALERTS And NOTIFICATIONS Calling for Manual
Intervention
    ELSE
        SEND EMAIL_ALERTS on Successful Reconciliation
``` also performs a replication check (step 312 of FIG. 3) between databases 109a-109b in the respective regions. As can be appreciated, additional inbound messages may be received between the time that (a) the failover is initiated and the message router 107a is notified to stop receiving messages on Topic A by orchestration service 110 and (b) message router 107b is notified to begin receiving messages on Topic A. In order to ensure that these messages have been properly received at database 109a and replicated to database 109b, health monitor 202a executes one or more queries against databases 109a-109b. In some embodiments, Also, as shown in FIG. 2, health monitoring service 108a-108b includes event sourcing module 202c and traceability engine 202d which are configured to reconcile transactions and identify anomalies after a failover is completed. FIG. 5 is a diagram of a reconciliation and anomaly identification workflow 500 after a failover switch between regions of a cloud computing environment, using system 100 of FIG. 1.

Event sourcing module 202c is configured to track important events (502), such as messages or transactions received by message router 107a-107b from ingress module 106a-

106b and persist the events into an events database for analysis. For example, ingress module 106a-106b or message router 107a-107b can be configured to capture events received in the region and transmit the events to event sourcing module 202c for storage in an events database.

After event sourcing module 202c has completed the storage of data for events, traceability engine 202d can analyze the event data and perform reconciliations for transactions at different levels. When traceability engine 202d identifies gaps during reconciliation (e.g., failed or missing transactions), engine 202d can replay those transactions from the point of failure (i.e., the time when the failover switch occurred) and/or trigger alerts for lost events. It should be appreciated that traceability engine 202d can perform different methods of reconciliation, such as core reconciliation 506, extended reconciliation 508, intraday reconciliation 510, and end of day reconciliation 512, with different actions resulting from the reconciliation process.

As shown in FIG. 5, engine 202d analyzes the event data (504) to identify lost events. In some embodiments, engine 202d determines an event state for each event to determine whether the event reached a successful or completed state. For example, each event can be assigned a state based upon its progression of each phase from ingestion to completion. For events that have not reached a final state, engine 202d can flag the events as incomplete or lost. In some embodiments, engine 202d replays (514) the transactions associated with lost events by, e.g., retrieving the messages associated with the event (from databases 109a-109b) and re-processing the messages through message router 107a-107b to downstream transaction manager 111. In some embodiments, engine 202d issues alerts (516) for lost events to prompt support personnel to research the events and/or associated transactions and perform remediation steps if needed.

Exemplary pseudocode for performing core reconciliation 506 and extended reconciliation 508 is provided below:

```
INIT DB_CONN
INIT Topics
INIT PRODUCER
INIT CONFIG_TIME <== 3MIN
INIT Sliding_Window [ START TIME , END TIME]
INIT FINAL_STATES
INIT INTERMEDIATE_FINAL_STATES
Every CONFIG_TIME DO:
    FETCH events which Fall in Sliding_Window FROM DB
    REPLAY_EVENT_COUNT = 0
    FOR Each event:
        IF events in FINAL_STATES OR INTERMEDIATE_FINAL_STATES:
        THEN
            Continue
        ELSE :
        GET RETRY COUNT From DB
        IF RETRY COUNT < 3:
        THEN
            GET Last Successful Event State
            GET Event Data from DB
            MAP Event to Topic
            Prepare Event to Send to Mapped Topic
            SEND event to Topic
            UPDATE EVENT ID , RETRY COUNT , TOPIC in DB
            INCREMENT REPLAY_EVENT_COUNT
        ELSE:
            Continue
    IF REPLAY_EVENT_COUNT is zero :
    THEN
        UPDATE Sliding_Window change START_TIME to END_TIME and
END_TIME to NOW
    ELSE:
        Continue
CLOSE DB_CONN
CLOSE PRODUCER
    Exemplary pseudocode for performing intraday reconciliation 510
is provided below:
INIT DB_CONN
INIT CONFIG_TIME <== 3MIN
INIT Sliding_Window [ START TIME , END TIME]
INIT FINAL_STATES
INIT INTERMEDIATE_FINAL_STATES
Every CONFIG_TIME DO:
    FETCH events which Fall in Sliding_Window FROM DB
    EVENT_ALERT_COUNT = 0
    FOR Each event:
        IF events in FINAL_STATES OR INTERMEDIATE_FINAL_STATES:
        THEN
            Continue
        ELSE :
            EXTRACT Topic and Last Successful Stage
            ADD TO ALERT_LIST
    IF EVENT_ALERT_COUNT is zero :
    THEN
        UPDATE Sliding_Window change START_TIME to END_TIME and
END_TIME to NOW
```

-continued

```
ELSE:
    SEND EMAIL Alert and NOTIFICATIONS of ALERT_LIST
CLOSE DB_CONN
    Exemplary pseudocode for performing end of day reconciliation 512
is provided below:
INIT DB_CONN
INIT MQ_CONN
INIT Topic
INIT Consumer
INIT PRODUCER
ON RECIEVING End OF Day Event from TOPIC:
STEP 1:
    EXTRACT END OF DAY Payload
    IF SUCCESS:
    THEN
        GO TO STEP 2:
    ELSE
        GO TO FAILURE_STEP:
STEP 2:
    GET LAST_RUN_TIME Of END OF DAY from DB
    RECONCILE EACH EVENTS Between START STATES and FINAL STATES From
LAST_RUN_TIME
    IF RECONCILE is SUCCESS
    THEN
        GO TO STEP 3:
    ELSE IF RECONCILE is FAILURE and RETRY < 3:
        WAIT 10 seconds
        GO TO STEP 2:
    ELSE
        GO TO FAILURE_STEP:
STEP 3:
    EXTRACT RECORD DATE from Payload
    OP1 = UPDATE RECORD DATE to DB
    OP2 = PRODUCE RECORD DATE to CACHE TOPIC
    OP3 = CONVERT RECORD DATE to JULIAN DATE FORMAT and PRODUCE to MQ
TOPIC
    if OP1 and OP2 and OP3 is SUCCESS
    THEN
        GO TO SUCCESS_STEP:
    ELSE
        GO TO FAILURE_STEP:
SUCCESS_STEP:
 GET PROCESSED EVENTS COUNTS from DB
 SEND SUCCESS EMAIL ALERT Of PROCESSED EVENTS COUNTS
FAILURE_STEP:
 SEND EMAIL ALERTS And NOTIFICATIONS Calling for Manual Intervention
CLOSE DB_CONN
CLOSE Consumer
CLOSE PRODUCER
```

As mentioned above, health monitoring service 108a-108b is configured to identify the occurrence of kickout exception events. In addition to triggering a failover switch when kickout exception events reach a defined threshold, service 108a-108b includes a kickout handler 202e that receives event and message data from health monitor 202a that relates to kickout exception events. For example, kickout handler 202e can receive transaction data from messages associated with kickout events and transmit the data to a remote computing device for investigation and remediation.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting the subject matter described herein.

What is claimed is:

1. A system for automatic transaction processing failover and reconciliation in a cloud-based environment, the system comprising:

a plurality of cloud-based system instances each comprising (i) one or more server computing devices configured to process transaction messages received from one or more remote computing devices and (ii) a database configured to store the transaction messages, wherein each cloud-based system instance:

monitors the processing of the transaction messages to identify one or more exception events, determines whether to initiate a failover switch based upon the identified exception events, when a failover switch is initiated for an affected cloud-based system instance:

identify a target cloud-based system instance for the failover switch, change a state of the affected cloud-based system instance to prevent the affected cloud-based system instance from receiving transaction messages, change a state of the target cloud-based system instance to receive transaction messages intended for the affected cloud-based system instance, and perform a replication check between the database in the affected cloud-based system instance and the database in the target cloud-based system instance; and reconciles transaction messages stored in the database of the affected cloud-based system instance to identify anomalies, including identifying one or more of the exception events as incomplete based upon an event state of the exception events and replaying the transaction messages associated with the incomplete events by retrieving the transaction messages from the database, determining a last successful state for each of the transaction messages, determining that a number of reprocessing tries associated with each of the transaction messages is less than a retry limit, and reprocessing each of the transaction messages to a final state by resubmitting each of the transaction messages to a downstream transaction manager queue that corresponds to the last successful state of the message.

2. The system of claim 1, wherein monitoring the processing of the transaction messages to identify one or more exception events comprises:

performing a database health check on the database; and identifying an exception event when the database health check fails.

3. The system of claim 1, wherein monitoring the processing of the transaction messages to identify one or more exception events comprises analyzing the transaction messages to identify exception events including one or more of: duplicate transactions, dead-letter messages, and system kickouts.

4. The system of claim 1, wherein monitoring the processing of the transaction messages to identify one or more exception events comprises:

calculating an end-to-end processing time for one or more transaction messages corresponding to a single transaction; and identifying an exception event when the end-to-end processing time exceeds a threshold value.

5. The system of claim 1, wherein determining whether to initiate a failover switch based upon the identified exception events comprises:

comparing one or more attributes of the identified exception events to one or more failover threshold values; and determining to initiate a failover switch based upon the comparison.

6. The system of claim 1, wherein identifying a target cloud-based system instance for the failover switch comprises requesting a target cloud-based system instance from an orchestration service.

7. The system of claim 6, wherein the target cloud-based system instance is assigned to a different region of the cloud-based environment than the affected cloud-based system instance.

8. The system of claim 1, wherein performing a replication check between the database in the affected cloud-based system instance and the database in the target cloud-based system instance comprises determining that each of a plurality of transaction messages from the database in the affected cloud-based system instance are also contained in the database in the target cloud-based system instance.

9. The system of claim 1, wherein each transaction message is associated with a message topic.

10. The system of claim 9, wherein changing a state of the target cloud-based system instance to receive transaction messages intended for the affected cloud-based system instance comprises enabling the target cloud-based system instance to receive transaction messages with a message topic assigned to the affected cloud-based system instance.

11. The system of claim 1, wherein reconciling transaction messages stored in the database of the affected cloud-based system instance to identify anomalies comprises:

grouping transaction messages received from the remote computing devices into one or more ingress transactions;

grouping transaction messages processed by the cloud-based system instance into one or more egress transactions;

determining whether the number of ingress transactions match the number of egress transactions; and generating an alert notification for transmission to a client computing device when the number of ingress transactions does not match the number of egress transactions.

12. The system of claim 1, wherein the target cloud-based system instance reverts the failover switch upon determining that the affected cloud-based system instance is able to resume transaction processing.

13. A computerized method of automatic transaction processing failover and reconciliation in a cloud-based environment, the method comprising:

processing, by a plurality of cloud-based system instances each comprising one or more server computing devices and a database, transaction messages received from one or more remote computing devices and stored in the database;

monitoring, by each cloud-based system instance, the processing of the transaction messages to identify one or more exception events;

determining, by each cloud-based system instance, whether to initiate a failover switch based upon the identified exception events;

when a failover switch is initiated for an affected cloud-based system instance:

identifying a target cloud-based system instance for the failover switch, changing a state of the affected cloud-based system instance to prevent the affected cloud-based system instance from receiving transaction messages, changing a state of the target cloud-based system instance to receive transaction messages intended for the affected cloud-based system instance, performing a replication check between the database in the affected cloud-based system instance and the database in the target cloud-based system instance; and reconciling transaction messages stored in the database of the affected cloud-based system instance to identify anomalies, including identifying one or more of the exception events as incomplete based upon an event state of the exception, determining a last successful state for each of the transaction messages, determining that a number of reprocessing tries associated with each of the transaction messages is less than a retry limit, and reprocessing each of the transaction messages to a final state by resubmitting each of the transaction messages to a downstream transaction manager queue that corresponds to the last successful state of the message.

14. The method of claim 13, wherein monitoring the processing of the transaction messages to identify one or more exception events comprises:

performing a database health check on the database; and identifying an exception event when the database health check fails.

15. The method of claim 13, wherein monitoring the processing of the transaction messages to identify one or more exception events comprises analyzing the transaction messages to identify exception events including one or more of: duplicate transactions, dead-letter messages, and system kickouts.

16. The method of claim 13, wherein monitoring the processing of the transaction messages to identify one or more exception events comprises:

calculating an end-to-end processing time for one or more transaction messages corresponding to a single transaction; and identifying an exception event when the end-to-end processing time exceeds a threshold value.

17. The method of claim 13, wherein determining whether to initiate a failover switch based upon the identified exception events comprises:

comparing one or more attributes of the identified exception events to one or more failover threshold values; and determining to initiate a failover switch based upon the comparison.

18. The method of claim 13, wherein identifying a target cloud-based system instance for the failover switch comprises requesting a target cloud-based system instance from an orchestration service.

19. The method of claim 18, wherein the target cloud-based system instance is assigned to a different region of the cloud-based environment than the affected cloud-based system instance.

20. The method of claim 13, wherein performing a replication check between the database in the affected cloud-based system instance and the database in the target cloud-based system instance comprises determining that each of a plurality of transaction messages from the database in the affected cloud-based system instance are also contained in the database in the target cloud-based system instance.

21. The method of claim 13, wherein each transaction message is associated with a message topic.

22. The method of claim 21, wherein changing a state of the target cloud-based system instance to receive transaction messages intended for the affected cloud-based system instance comprises enabling the target cloud-based system instance to receive transaction messages with a message topic assigned to the affected cloud-based system instance.

23. The method of claim 13, wherein reconciling transaction messages stored in the database the affected cloud-based system instance to identify anomalies comprises:

grouping transaction messages received from the remote computing devices into one or more ingress transactions;

grouping transaction messages processed by the cloud-based system instance into one or more egress transactions;

determining whether the number of ingress transactions match the number of egress transactions; and generating an alert notification for transmission to a client computing device when the number of ingress transactions does not match the number of egress transactions.

24. The method of claim 13, wherein the target cloud-based system instance reverts the failover switch upon determining that the affected cloud-based system instance is able to resume transaction processing.

* * * * *